Aug. 1, 1961  J. H. SMITH  2,994,574
MAGNETIC SENSING CUT-OFF SYSTEM
Filed Sept. 28, 1955  2 Sheets-Sheet 1

INVENTOR
Joe H. Smith
BY Stevens, Davis, Miller and Mosher
ATTORNEYS

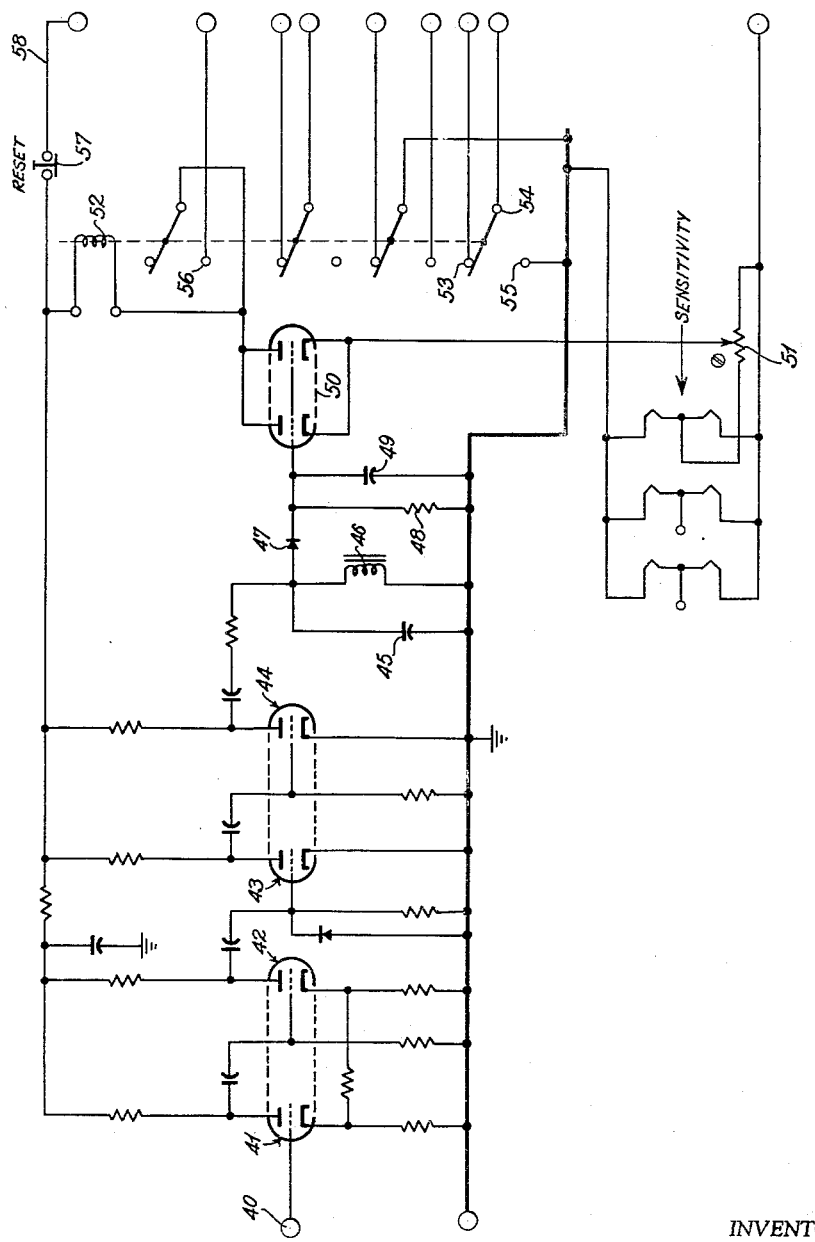

United States Patent Office 2,994,574
Patented Aug. 1, 1961

1

2,994,574
MAGNETIC SENSING CUT-OFF SYSTEM
Joe H. Smith, Dallas, Tex., assignor to Texas Instruments Incorporated, Dallas, Tex., a corporation of Delaware
Filed Sept. 28, 1955, Ser. No. 537,211
8 Claims. (Cl. 346—74)

The present invention relates to a system for controlling the commencement and duration of a magnetic recording. More particularly, the present invention relates to a system of magnetic recording on an endless medium such as a disk which functions to establish a sensible record incident to a normal recording operation whereby it is possible to determine the beginning and ending of the recording operation.

The present invention is especially adapted for use in conjunction with seismic surveying work. It will be appreciated that in conventional seismic prospecting it is customary to arrange a plurality of seismometers or geophones in a pattern on the earth's surface over the formations to be investigated. This arrangement of geophones is known as a spread. An explosive charge is then placed at a predetermined location in relation to the spread, known as the shot point, and a blaster is connected to fire the shot when all else is in readiness. The firing of the shot is referred to as the time break. The seismic waves generated upon firing the shot travel downwardly into the earth and are reflected back to the surface from layers where a change in density occurs. The reflected waves are then detected by the geophones of the spread and converted to corresponding electrical signals. In recent years, it has been proposed to record the output signals from the respective geophones through broadband filters on separate channels on a magnetic medium. By means of this technique, it is possible to record all the available information from a given seismic prospect and then reproduce this information at will for subsequent analysis.

The system of the present invention is primarily concerned with magnetic recording operations involving the use of an endless record medium, preferably a disk. The system functions to produce a record of seismic information utilizing as much as possible of the available record area without the danger of overrunning portions of the record upon which seismic information has been recorded.

These ends are generally accomplished by means of the present invention by effecting the controlled recording of a preselected intelligence signal upon an endless record medium during the waiting period prior to receiving seismic information. Automatically responsive to initiation of a particular event, a second intelligence signal is caused to supplant the first and is continuously recorded. As the record medium advances past a second point spaced from the point of recording, the break between the first and second intelligence signals is detected and the detection unit functions automatically to cut-off the recording opertions. As mentioned above, it is preferred that the recording medium be in the form of a disk. The point at which recording of the intelligence signals is effected and the point at which detection of the break between intelligence signals occurs are arranged peripherally spaced relative to the record disk. There is introduced by this arrangement a time factor whereby the recording operations are carried out during the time it takes a point on the disk to rotate from the recording head to the detection point.

The intelligence signals mentioned above are recorded on the disk in a concentric narrow record path. There are avaialable on the disk many other concentric record paths which can be utilized for the recording of seismic information from the geophones of a spread, recording a timing signal and for recording various other data and references. It is significant, however, that all such record paths will be correlated with and controlled by the record path for the intelligence signals from a time standpoint.

It is, therefore, an object of the present invention to provide a system for controlling a magnetic recording operation and, more specifically, to control a magnetic recording operation being carried out as part of a seismic survey. In this regard, the system of this invention initiates the recording operation when the time break occurs and allows the operation to continue for a fixed period of time at the expiration of which the system automatically terminates the recording operation.

It is a further object of the present invention to provide a novel system for controlling a magnetic recording operation and more specifically for controlling a magnetic recording operation forming a part of a seismic surveying investigation which functions in an efficient and expedient fashion by automatically starting and stopping the recording operations at the most favorable times whereby more desirable records of seismic information are obtained.

It is a still further object of the present invention to provide a system for controlling the magnetic recording of seismic signals in a way that makes it feasible to obtain permanent records of useful seismic data on a flat disk record.

Other objects and advantages of the present invention will become more readily apparent from the following detailed description of the present invention when taken in conjunction with the drawings in which:

FIGURE 3 is a schematic representation of the automatic cut-off of the system.

Figure 1:
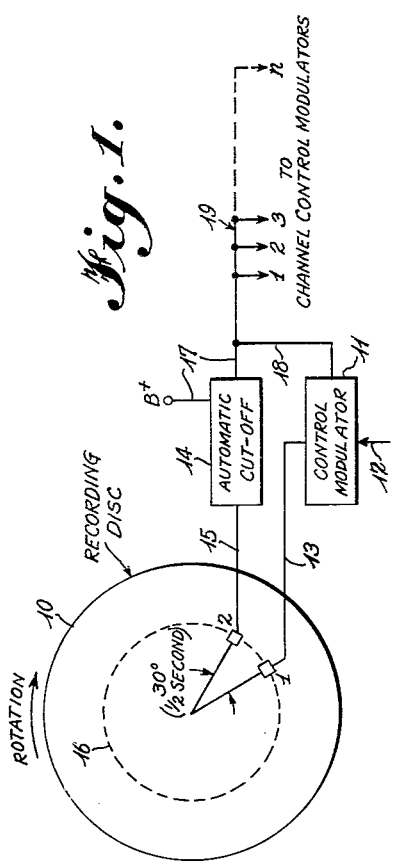
FIGURE 1 is a schematic view illustrating the general nature of the present invention.

Referring now in detail to the drawings, there will be described a preferred embodiment of the present invention. There is shown in FIGURE 1 a recording disk designated by the numeral 10 and mounted by any suitable means for rotation in a direction as indicated by the arrow. Arranged in cooperation with the recording disk 10 are a pair of recording and pick-up heads 1 and 2. As will be evident from the legend, the heads 1 and 2 are peripherally spaced approximately 30 angular degrees to record signals on and pick up signals respectively from a concentric magnetic path 16. A control modulator 11 is connected by line 13 with head 1 and an automatic cut-off 14 is connected by line 15 to head 2. The time break pulse is fed to control modulator by lead 12. The modulator plate voltage supply path 17, which is controlled by automatic cut-off 14, is connected to leads 18 and 19. Lead 18 feeds the plate voltage from path 17 to control modulator 11 and lead 19 indicates generally the plate voltage being fed to 1, 2, 3 . . . n channel control modulators.

In operation, the control modulator 11 of the system is adjusted to put out a fixed frequency signal, as for example, 2,000 c.p.s. The output from the control modulator 11 continues at this fixed frequency during the waiting period, that is during the period preceding the occurrence of an event which triggers the actual recording operation. During this period, the modulators for all of the recorder channels are operating and the carrier frequency or the output of the control modulator 11 is continuously recorded on the disk by control head No. 1. Then, when the blaster of the seismic surveying equipment is fired, a time break pulse is applied to the input of the control modulator 11 by lead 12 and this time break pulse triggers a flip-flop multivibrator which in turn alters the output frequency of the control modulator 11 to a different fixed frequency, for example, 4,000 c.p.s. Thus, after the time break pulse, the 4,000 c.p.s. signal is continuously recorded by control head 1. When the leading edge of the 4,000 c.p.s. signal recorded on path 16 of the disk 10 reaches control head 2, the change in frequency from 2,000 c.p.s. to 4,000 c.p.s. is sensed by the automatic cut-off 14 and at this time the plate supply voltage is automatically removed from control modulator 11 and channel control modulators 1, 2, 3 . . . n and, thus, the record is terminated. It will be appreciated that, in addition to control heads 1 and 2, there are provided a large number of other recording heads cooperating with other distinct concentric record paths on the disk 10. These other heads receive seismic data from seismometers in the spread or serve other functions such as recording timing signals and such signals are fed to these heads through the control channel modulators 1, 2, 3 . . . n.

The period or duration of the magnetic recording will be determined by the speed at which the disk 10 is driven. It is proposed that the disk 10 be driven at a fixed speed of 11 r.p.m. This means that each full revolution of the disk 10 will take about 5½ seconds. Since the control heads 1 and 2 are peripherally spaced by approximately 30 angular degrees, there will result by virtue of the above described operation a time sequence on the record of approximately one-half second of unmodulated signal or 2,000 c.p.s. signal and approximately five seconds of seismic information corresponding with the five seconds of modulated signal or 4,000 c.p.s. signal.

Figure 2:
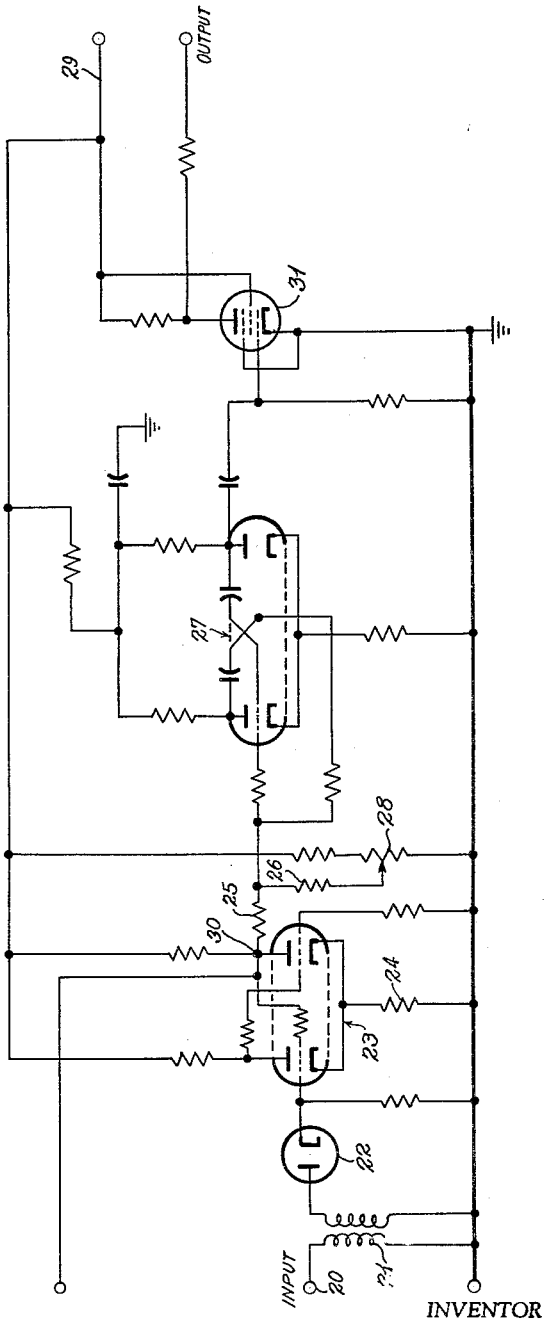
FIGURE 2 is a schematic representation of the control modulator of the system.

The control modulator 11 is shown schematically in FIGURE 2. The input to the control modulator is indicated by the contact 20. It will be appreciated that the control modulator receives its input (time break pulse) from the blaster of the seismic surveying equipment. The time break pulse is a negative pulse, and is stepped up by means of transformer 21 and fed to a wave clipper 22 which eliminates negative pulses at the grid input of a flip-flop multivibrator generally indicated as 23. The right side of the multivibrator 23 is normally conducting and the current flow through cathode resistor 24 develops a voltage which keeps the left side of tube 23 cut off. When a positive pulse is applied to the grid of the left side of tube 23, this half of the tube begins to conduct. When this occurs, the plate voltage drops and pushes the grid voltage on the right side of the tube down, reducing the current in the right half of the tube. This action continues until the left half of the tube is conducting and the right half is cut off. Thus, there will be a sudden rise in the D.C. voltage at point 30 in the plate circuit of the right half of the tube 23 when the time break occurs. A voltage divider network consisting of resistances 25 and 26 is provided to determine the voltage swing at the input to a free running multi-vibrator, indicated generally as 27. Consequently, this arrangement will also determine the frequency shift due to occurrence of the time break signal. A resistance 28 determines the frequency of the multivibrator prior to the arrival of the time break pulse. It is intended in the apparatus of the present invention that the resistance 28 be adjusted or set to give at the output of the multivibrator 27 a 2,000 c.p.s. signal before the arrival of the time break. The frequency at the output of the multivibrator 27 by virtue of the action of the circuit will be altered to approximately 4,000 c.p.s. upon the arrival of the time break pulse. The output from the multivibrator 27 is coupled to a pentode power amplifier 31 and its output in turn is coupled to recording head No. 1. The plate power supply for the several tubes of the circuit is introduced through lead 29. In addition to the components described, it will be appreciated that there are shown various other circuit elements such as resistors and condensers. Since the function of these elements as load resistors, couplers, etc., is well-known it does not seem essential to discuss them in detail as the above description should suffice for an understanding of the circuit shown in FIGURE 2.

The details of the automatic cut-off 14 are shown in the schematic of FIGURE 3. The control head No. 2 is coupled to the grid of a first amplification stage 41. In FIGURE 3, the control head 2 is connected to contact 40 which leads directly to the grid of the first amplification stage 41. There are provided four such amplification stages and these have been assigned the numerals 41, 42, 43, and 44. The amplification stages are of high gain and are capacitor coupled. The output of the last stage, 44, is coupled to a parallel tuned circuit consisting of a condenser 45 and inductance 46. This tuned circuit is resonant at 4,000 c.p.s. The voltage across the tuned circuit is rectified by diode 47 and filtered by means of an RC circuit consisting of resistance 48 and condenser 49. Thus, there will be produced a D.C. voltage at the grid input of the double triode 50. The power supply for the plates of all tubes in this particular circuit is fed through line 58.

By virtue of the arrangement described above, the D.C. voltage at the grid input to tube 50 will be small except near the resonant frequency of the tuned circuit. A resistor 51 is provided to adjust the bias of the tube 50 so that any signals passed by tube 50 will not be of sufficient intensity to bring about the energization of a relay 52 connected in the plate circuit of the tube 50. The arrangement is such that the relay 52 will become energized only during the high frequency portion of the cycle of the control signal and will drop out during the low frequency portion. Thus, when the leading edge of the higher frequency signal, 4,000 c.p.s., is detected by the control head 2, the relay 52 will be energized. The relay 52 functions in the following manner. The power supply voltage for all modulator tubes in the control modulator 11 as well as modulator circuits 1, 2, 3 . . . n being operated in conjunction with the recording of seismic data is fed to pin 53 of the relay 52. As long as the apparatus is in the waiting period, or the 4,000 c.p.s. signal has not been detected by control head No. 2, the plate supply voltage for the modulators will be fed to them by virtue of contact 53 and contact 54 being closed. When, however, the control head No. 2 detects the shift to the higher frequency, the relay 52 becomes energized and all modulator plate circuits will be grounded through pin 55 in order to cease the recording operations and also to reduce random noise pickup by the heads.

When the relay 52 is energized, the plate supply for all the modulator tubes will be removed. In order to provide a lock-in feature for the relay 52, the tube 50 will be grounded through contact 56. Therefore, it will be necessary in order to activate the circuit to operate reset 57. The remaining contacts of the relay 52 are utilized to ground the filaments of all tubes of either the recording or reproducing sections of the seismic recording apparatus, depending upon the operations being conducted. Thus, power will be afforded the receiving filaments when relay 52 is de-energized and will be grounded when relay 52 is energized and power will be afforded the reproducing filaments when the relay 52 is energized and will be grounded when the relay 52 is de-energized. Other contacts of the relay 52 are for the purpose of establishing a closed circuit when the relay is de-energized to provide a means for starting an auxiliary apparatus such as a camera on play-back.

Although the present invention has been shown and described with reference to a single preferred embodiment, it will be appreciated that various and obvious changes and modifications to the system can be made without departing from the scope of the present invention. Hence, such changes and modifications as readily suggest themselves to one skilled in this art from the knowledge of the teachings of the present invention are deemed to fall within the spirit and contemplation of the invention.

What is claimed is:

1. A system comprising a pair of control heads arranged spaced apart and with reference to a magnetic path on a record elements, means to feed to the first control head of said pair a pre-selected signal for recording in said path, means to change said pre-selected signal to a different pre-selected signal to be fed to said first control head for recording in said path upon the occurrence of a desired event, and means associated with the second control head of said pair for detecting the change in pre-selected signals recorded in said path and responsive thereto for stopping further recording by said first control head.

2. A system for controlling a magnetic recording operation being conducted on a record element comprising a pair of control heads arranged spaced apart and with reference to a magnetic path on a record element, at least one recording head arranged with reference to a second magnetic path on said record element, means to feed signals to said at least one recording head for recording on said element, means to feed to the first control head of said pair of a pre-selected signal for recording in said path, means to change said pre-selected signal to a different pre-selected signal to be fed to said first control head for recording in said path upon the occurrence of a desired event, and means associated with the second control head of said pair for detecting the change in pre-selected signals recorded in said path and responsive thereto for stopping further recording by said recording heads.

3. A system comprising a pair of control heads arranged spaced apart and with reference to an endless magnetic path on a record element, means to feed to the leading control head of said pair a pre-selected signal for recording in said path, means to change said pre-selected signal to a different pre-selected signal to be fed to said leading control head for recording in said path upon the occurrence of a desired event, and means associated with the trailing control head of said pair for detecting the change in pre-selected signals recorded in said path and responsive thereto for stopping further recording by said leading control head.

4. A system for controlling a magnetic recording operation being conducted on a record element comprising a pair of control heads arranged spaced apart and with reference to an endless magnetic path on a record element, at least one recording head arranged with reference to a second magnetic path on said record element, means to feed signals to said at least one recording head for recording on said element, means to feed to the leading control head of said pair a pre-selected signal for recording in said path, means to change said pre-selected signal to a different pre-selected signal to be fed to said leading control head for recording in said path upon the occurrence of a desired event, and means associated with the trailing control head of said pair for detecting the change in pre-selected signals recorded in said path and responsive thereto for stopping further recording by said recording heads.

5. A system comprising a pair of control heads arranged spaced apart and with reference to an endless magnetic path on a record element, means to feed to the leading control head of said pair a pre-selected signal for recording in said path, means to change said pre-selected signal to a different pre-selected signal to be fed to said leading control head for recording in said path upon the occurrence of a desired event, means associated with the trailing control head of said pair for detecting the change in pre-selected signals recorded in said path, and means responsive to the detection of the change in signals for stopping further recording by said leading control head.

6. A system for controlling a magnetic recording operation being conducted on a record element comprising a pair of control heads arranged spaced apart and with reference to an endless magnetic path on a record element, at least one recording head arranged with reference to a separate magnetic path on said record element, means to feed signals to said at least one recording head for recording on said element, means to feed to the leading control head of said pair a pre-selected signal for recording in said path, means to change said pre-selected signal to a different pre-selected signal to be fed to said leading control head for recording in said path upon the occurrence of a desired event, means associated with the trailing control head of said pair for detecting the change in pre-selected signals recorded in said path, and means responsive to detection of the change in signals for stopping further recording by said recording heads.

7. In a seismic surveying system wherein the outputs of a plurality of seismometers are individually magnetically recorded on a moving record element, the improvement that comprises a pair of control heads arranged spaced apart and with reference to a magnetic path on the record element, means to feed to the first control head of said pair a pre-selected signal for recording in said path, means to change said pre-selected signal to a different pre-selected signal to be fed to said first control head for recording in said path upon the occurrence of a time break, and means associated with the second control head of said pair for detecting the change in pre-selected signals recorded in said path and responsive thereto for stopping further recording.

8. In a seismic surveying system wherein the outputs of a plurality of seismometers are individually magnetically recorded on a moving record element, the improvement that comprises a pair of control heads arranged spaced part and with reference to a magnetic path on the record element, means to feed to the first control head of said pair a pre-selected signal for recording in said path, means to change said pre-selected signal to a different pre-selected signal to be fed to said first control head for recording in said path upon the occurrence of a time break, means associated with the second control head of said pair for detecting the change in pre-selected signals recorded in said path, and means responsive to the detection of the change in signals for stopping further recording.

References Cited in the file of this patent

UNITED STATES PATENTS

| | | |
|---|---|---|
| 1,902,183 | Rieber | Mar. 21, 1933 |
| 2,378,388 | Begun | June 19, 1945 |
| 2,439,446 | Begun | Apr. 13, 1948 |
| 2,702,315 | Roderick | Feb. 15, 1955 |